(12) United States Patent
Leis et al.

(10) Patent No.: US 8,186,099 B2
(45) Date of Patent: May 29, 2012

(54) METHOD FOR PRODUCING PROPAGATING MATERIAL TO BE USED IN TREE CULTIVATIONS OF DOUBLE-TRUNK TYPE

(75) Inventors: Michelangelo Leis, Ferrara (IT); Carlo Mazzola, Ferrara (IT)

(73) Assignee: Societa' Agricola Vivai Mazzoni Societa Semplice, Tresigallo (IT)

( * ) Notice: Subject to any disclaimer, the term of this patent is extended or adjusted under 35 U.S.C. 154(b) by 155 days.

(21) Appl. No.: 12/444,771

(22) PCT Filed: Oct. 15, 2007

(86) PCT No.: PCT/IB2007/054194
§ 371 (c)(1),
(2), (4) Date: May 28, 2009

(87) PCT Pub. No.: WO2008/047297
PCT Pub. Date: Apr. 24, 2008

(65) Prior Publication Data
US 2010/0037359 A1 Feb. 11, 2010

(30) Foreign Application Priority Data

Oct. 19, 2006 (IT) ............... RM2006A0568

(51) Int. Cl.
*A01G 13/02* (2006.01)

(52) U.S. Cl. ............................................. 47/6
(58) Field of Classification Search ................ None
See application file for complete search history.

(56) References Cited

FOREIGN PATENT DOCUMENTS

| BE | 370 237 | 5/1930 |
| FR | 1 260 795 | 5/1961 |
| NL | 1 001 636 | 6/1997 |
| WO | 97/39616 | 10/1997 |

OTHER PUBLICATIONS

Proebski et al. Effect of rootstocks and double trunk on growth and fruiting of Rubin apple trees. Folia Horticulturae Ann. 18/1, 2006, 73-80.*
Poniedzialek et al. Effect of Double-trunk on growth and fruiting of 'Jonagold' apple trees. Folia Horticulturae Ann. 13/1, 2001, 65-71.*
Int'l Search Report for PCT/IB2007/054194, three pages (Apr. 2008).
Written Opinion for PCT/IB2007/054194, five pages (Apr. 2008).
Int'l Preliminary Report on Patentability for PCT/IB2007/054194, five pages (Jan. 2009).

* cited by examiner

*Primary Examiner* — Annette Para
(74) *Attorney, Agent, or Firm* — Nixon & Vanderhye PC

(57) ABSTRACT

The present invention relates to a method for producing propagating material, in particular whole plants, to be used in tree cultivations of double trunk type and the obtained material.

15 Claims, 2 Drawing Sheets

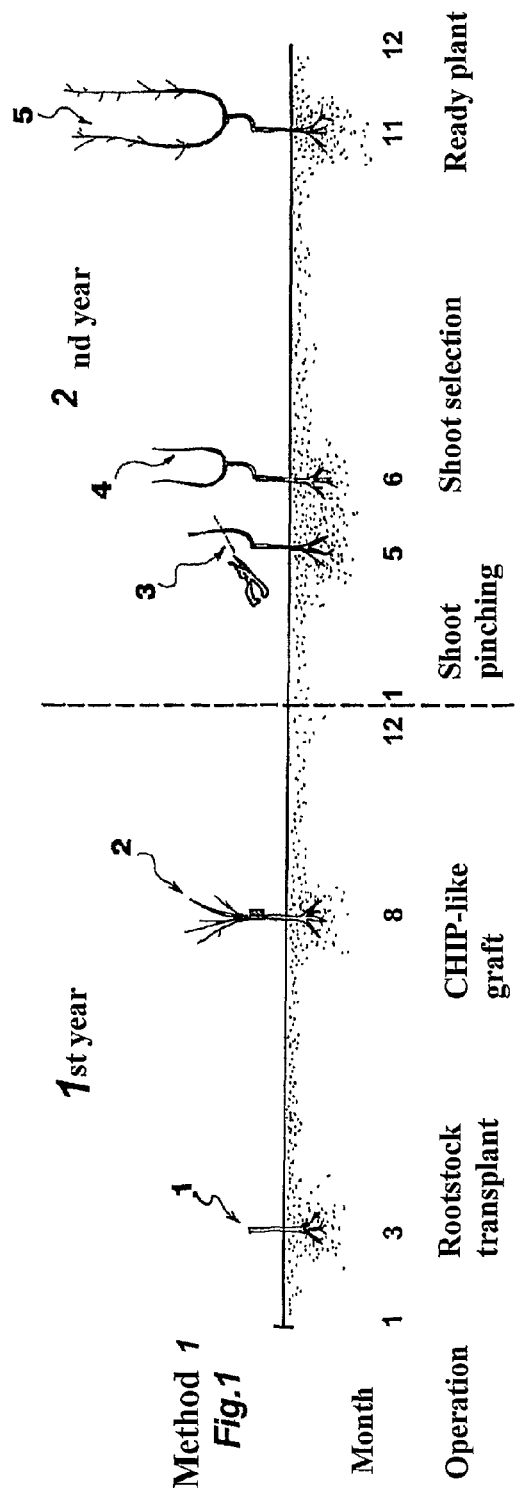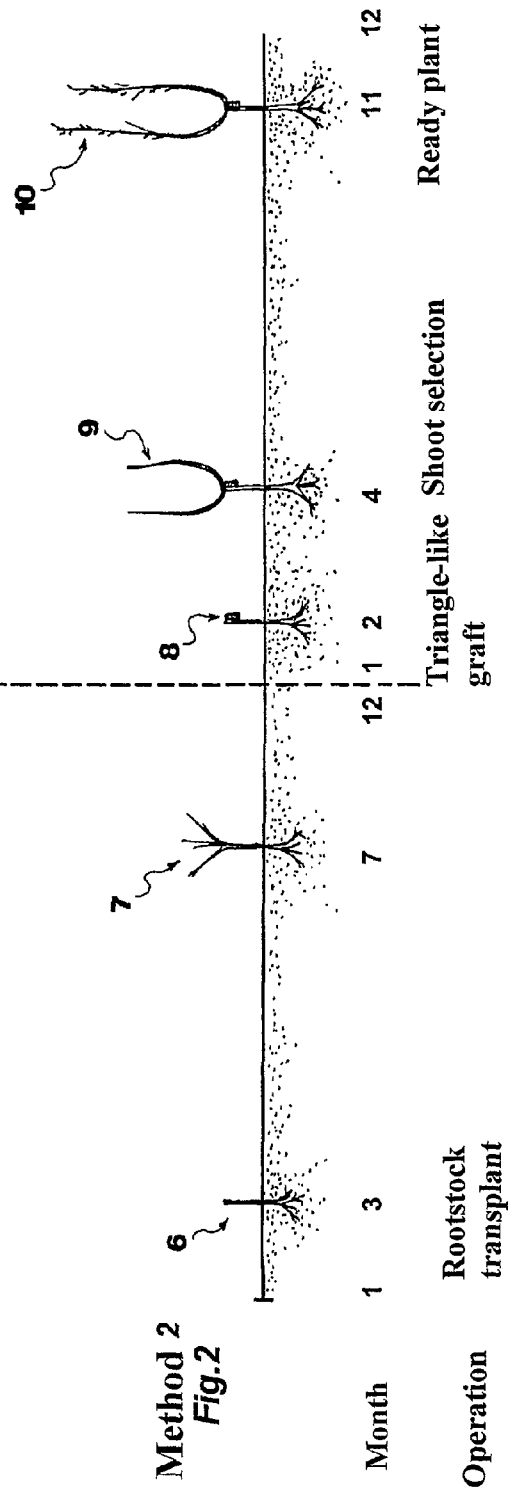

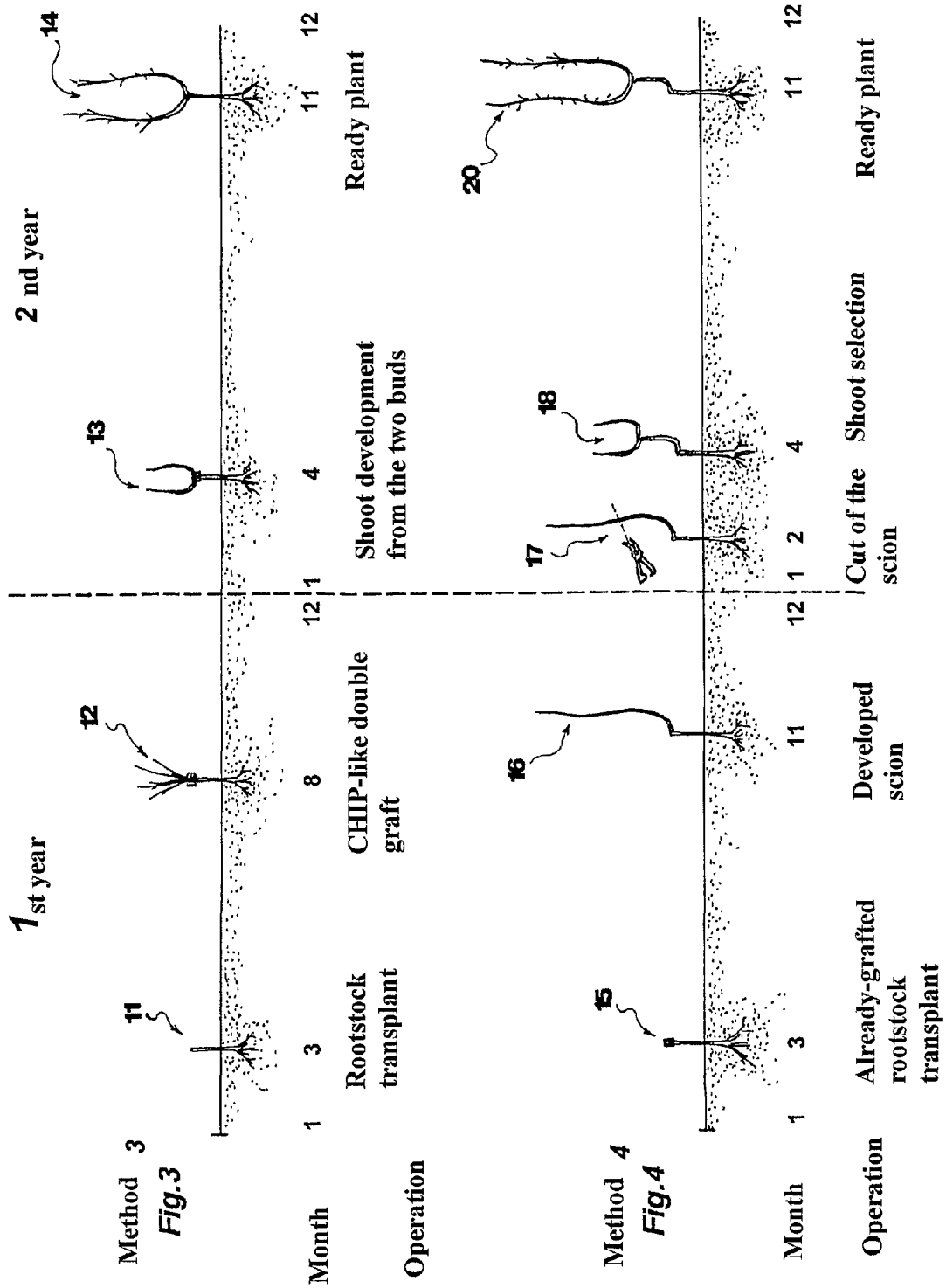

METHOD FOR PRODUCING PROPAGATING MATERIAL TO BE USED IN TREE CULTIVATIONS OF DOUBLE-TRUNK TYPE

This application is the U.S. national phase of International Application No. PCT/IB2007/054194, filed 15 Oct. 2007, which designated the U.S. and claims priority to Application No. IT RM2006A000568, filed 19 Oct. 2006; the entire contents of each of which are hereby incorporated by reference.

The present invention relates to a method for producing propagating material, in particular entire plants, to be used in tree cultivations of double trunk type and the obtained material.

STATE OF ART

The foliage of a tree, differently from the animal organisms, wherein the various parts and members of the body play specific, complementary and synergic functions, is composed of parts which are often in competition therebetween (Bailey 1916; C. Giulivo 1990). Men, trying to favour the productive and qualitative expression of fruit trees depending upon their own needs, have intervened for centuries upon the development of trees by means of interventions of various type, in particular by means of grafting and pruning.

The historical yearbooks of fruit growing, and even before old texts of pomology, count tens of different forms for growing fruit trees, which can be obtained with the most various methodologies for intervening onto the tree structure.

In the industrial fruit growing, more and more commonly the first intervention onto the structure, which will then influence the whole vegeto-productive life of the tree, is performed in the nursery, that is upon the plant initial development.

The most recent knowledge of physiology and eco-physiology about fruit plants and in particular about the pome fruit (Pomacee), have demonstrated that the plants preformed in the nursery, whether they are one-year-old scions or so-called two-year-old "knipp" plants, constituted by one single trunk equipped with a congruous number of anticipated branches, placed at the desired height, constitute the best starting material to obtain effective orchards from the productive and qualitative point of view and for a quick fructification.

However, the use of monocaulis plants (that is with a single trunk) in the production of orchards has some drawbacks:
  need for manually positioning the anticipated branches according to the wished tilting;
  need for having a layer of branches at the basis of the productive wall to reduce the excess of the vigor and the growth of the distal portion of the foliage;
  excessive shading of the fruits placed onto the basal branches of the plant;
  heterogeneity in size, colour, ripening of fruits due to the insertion thereof onto branches of different order and that is primary, secondary and tertiary branches;
  not optimal photosynthetic effectiveness due to the excessive shading of the leaves placed in the basal and central portion of the tree;
  difficulty in controlling the plant strength;
  presence of a high number of branches with vegetating apexes, with consequent reduction in the induction to flower and in the tree productive capability.

In past, in the orchards, double trunk growing forms were used, even if occasionally. These growing forms (for example, ypsilon-like forms) request expensive operations after the orchard implantation to obtain the desired shape. This is mainly due to the fact that, up to now, no techniques for producing bicaulis (i.e. double trunk) plants in nursery were available, that is plants immediately ready to be used for constituting double trunk orchards. Therefore, in the state of art the need was felt to have available such techniques.

The applicant for the present patent, trying to obviate these drawbacks, has developed a method for producing propagating material in nursery, apt to obtain a double trunk plant type.

Therefore, the object of the present invention is a method for producing fruit tree plants of double trunk type, comprising the following steps:
  a. transplant of a rootstock in soil for cultivation: and cultivation thereof;
  b. graft onto said rootstock of propagating material of the variety to be reproduced for producing shoots;
  c. selection and/or modification of the position of said shoots with the aim of obtaining two shoots placed opposite each other on each one of said plants and
  d. cultivation of said plants until the stadium wherein they can be planted out for the fruit production.

Four figures are enclosed with the present description, showing:
  FIG. 1 a method for obtaining double trunk plants using a so-called "chip"-like graft;
  FIG. 2 a method for obtaining double trunk plants using a so-called triangle-like graft;
  FIG. 3 a method for obtaining double trunk plants using a so-called double-grafted "chip"-like graft;
  FIG. 4 a method for obtaining double trunk plants using a so-called developed-scion-like graft.

The double trunk plants with respect to the tree produced up to now in nursery, with a single trunk, with more or less important side branches are characterized by two symmetric scions, grown vertically and with fruit branches inserted directly onto the main trunks of the plant.

For the optimal success of this new technique for cultivating fruit trees it is necessary to have available plants which have been adequately prepared in nursery so as to obtain on one single root two scions, homogeneous and symmetric therebetween as much as possible, as well as equipped with side small branches (in technical terms called anticipated branches) suitable as to quantity, size and position onto two trunks constituting the double trunk plant. The fruit plants are commonly produced in nursery by grafting the desired variety onto suitable rootstocks, in order to obtain a plant with a single trunk, more or less equipped with side branches. The double trunk plant can be obtained with the following methodologies:

1. The shoot which has developed in spring from the graft carried out in the previous summer or in winter, is pinched to favour the emission of several shoots, the best two and the more uniform ones thereof are chosen in order to obtain two main stems.
2. The graft is carried out in winter with the various techniques commonly utilized in this season (triangle-like, split-like, V-like technique, etc). Instead of letting one single shoot to develop which will originate a monocaulis film, two shoots are selected in order to obtain a bicaulis (double-trunk) plant.
3. Cut out or knipp scion. The knipp technique currently constitutes one of the methods most used to obtain single trunk plants well equipped with anticipated branches. This technique consists in making a scion with reduced size to develop the first year and then to cut at 60/80 cm from the ground and to select a single shoot to constitute the central axis of the new plant. With respect to the traditional technique, the scion is cut out lower down and then two shoots are selected in order to obtain two trunks with equal vigor.

4. Double bud. The usual methodology for producing the plant in nursery provides for the use of one single bud; in the present invention, in case of the double trunk, a double graft is performed, using two buds grafted onto one single rootstock; in this way two homogeneous and symmetric scions are obtained.

All these methodologies can be applied even in case an intermediate graft is used, such as for example with varieties of pear not much or not at all compatible with the quinces used as rootstock.

The plants obtained with these methodologies will originate in orchard bicaulis (double-trunk) trees constituted by two vertical trunks inserted onto one same rootstock and therefore with a single root.

The obtainable shape can be assimilated to a double vertical cord, but, with respect thereto and with respect to the other shapes known up to now it has the following advantages:

1. Considerable reduction in the pruning interventions during the growing since the two scions are equipped with opened and well-positioned side branches, therefore expensive folding and positioning interventions are not requested as necessary in the traditional growing techniques. The interventions will limit to the elimination of the possible excessively vigorous branches.
2. Reduction in vigor by means of dividing the plant energy on two trunks instead of one.
3. Optimal exposure to the light of fruits, with considerable increase in colour and quality of fruits, reduction in the number of the harvesting interventions.
4. Greater uniformity of the overall characteristics of the fruits in terms of size, colour, ripening homogeneity and intrinsic qualities. This derives from the fact that all fruits are brought by uniform fruit branches and inserted directly onto the plant trunks.
5. Greater photosynthetic effectiveness of the plant due to the minor shading of the foliage and to the better interception of light by the leaves. This is shown also by the fact that the leaves have greater sizes, they are thicker and they have a more intense green colour as they are more rich in chlorophyl.
6. Almost total elimination of the so-called "suckers", that is vigorous branches, mostly with erect bearing, which come in direct competition with the plant productive portions, they reduce the induction to flower due to the production of gibberellins and they request heavy pruning interventions for the elimination thereof.
7. Increase in the productive effectiveness and reduction in the problems linked to the alternation of production.

The double trunk plants preformed in nursery according to the method of the present invention, in addition to reducing the costs and the difficulties for obtaining double trunk orchards with monocaulis plants, have the advantage of a quick start of fructification. This consequently causes a reduction in the orchard amortization time not obtainable with the traditional methods. Furthermore, the double trunk plants, compared to the traditional ones, have a primary basal trunk with a larger diameter with respect to the single trunk plants, whereas the two trunks have more reduced sizes with respect to the single trunk. This in addition to reducing the vigor, as described previously, allows supporting a considerably greater load of fruits with respect to the traditional plants. At the same time, for the previously described features, a constant renewal of flower buds is obtained and the risk of production alternation is reduced significantly.

Hereinafter specific methods for producing double trunk plants will be described, which have been implemented by following the present invention, by using the grafting techniques known to the person skilled in the art. The indications of the periods of time when the described operations take place are indicative and referred, for sake of illustrative purposes, to the rate of seasons of the northern hemisphere and, however, they are to be considered indicative as to the sequence thereof.

Method with "Chip"-Like Graft

By referring to FIG. 1, the scheme illustrates that in the first year, approximately in the month of March, a rootstock, designated with 1, is transplanted, whereon in the month of August, the variety to be reproduced is grafted with the so-called "chip"-like graft (shown in 2). Under the term "chip"-like graft, the graft of a bud showing with an underlying small wooden portion is meant. In the second implantation year, approximately in the month of April, one proceeds with modifying the position of the shoots, by means of pruning (3), in order to obtain two shoots with opposed development (4) on the plant. The ready plant is shown with 5.

Method with Triangle-Like Graft

By referring to FIG. 2, the scheme shows that in the first year, approximately in the month of March, a rootstock, designated with 6, is transplanted, whereon, in the month of February of the following year, the variety to be reproduced is grafted with the so-called triangle-like graft (8). Under the term triangle-like graft, the insertion of a wooden scion within a triangle-shaped notch is meant. In the month of April one proceeds to select the position of the shoots (9). The ready plant is shown with 10.

Method with "Chip"-Like Double Graft

By referring to FIG. 3, the scheme shows that in the first year, approximately in the month of March, a rootstock, designated with 11, is transplanted, whereon, in the month of August, the variety to be reproduced is grafted with the so-called "chip"-like double graft (shown with 12). In the second implantation year, approximately in the month of April, the two grafted buds will originate two shoots to obtain two trunks with opposed development (13) on the plant. The ready plant is shown with 14.

Method with Developed Scion

By referring to FIG. 4, the scheme shows that in the first year, approximately in the month of March, a rootstock already grafted with the variety to be reproduced (15) is transplanted. In the month of November the scion has already developed. In the following year, approximately in the month of February, one proceeds with pinching the scion (17). Approximately in the month of April of the same year, one proceeds to select two shoots which have originated immediately below the polling cut, in order to obtain two shoots with opposed development (18) on the plant. The ready plant is shown with 20.

The plants obtainable from the described and claimed method form also subject of the present invention. Said method, even if it can be applied generally, is particularly suitable to produce double trunk plants of pome fruits (Pomacee), in particular pear and apple trees. The present invention has been described with reference to a currently preferred embodiment thereof, but it will be understood that variants and modifications could be introduced in practice by a person skilled in the art, however comprised within the protective scope of the present industrial invention.

The invention claimed is:

1. A method for producing pome fruit tree plants of double trunk type, the method comprising:
   a. transplanting of a rootstock in soil for cultivation and cultivation thereof;
   b. grafting onto said rootstock propagating material of the variety to be reproduced for producing shoots;

c. selecting and/or modifying the position of said shoots with the aim of obtaining two shoots placed opposite each other on each one of said plants; and d. cultivating said plants until they can be planted.

2. The method according to claim 1, wherein in said step b) the graft of propagating material is carried out by means of a so-called "chip"-like graft and in said step c) said modification of the position of the shoots is carried out by means of pinching.

3. The method according to claim 1, wherein in said step b) the graft of propagating material is carried out by means of a so-called triangle-like graft and the selection of shoots is carried out in order to obtain shoots placed opposed each other.

4. The method according to claim 1, wherein in said step b) the graft of propagating material is carried out by means of a so-called "chip"-like graft of two buds onto the same rootstock.

5. The method according to claim 1, wherein the method comprises:
   a. transplanting of an already grafted rootstock with the variety to be reproduced and cultivation thereof until obtaining a developed pole,
   b. cutting of a pole portion;
   c. selecting and/or modifying the position of the shoots which have originated below said cut onto said pole in order to obtain two trunks; and
   d. cultivating said plants until they can be planted.

6. A pome fruit plant obtainable according to a method comprising:
   (a) transplanting of a rootstock in soil for cultivation and cultivation thereof,
   (b) grafting onto said rootstock propagating material of the variety to be reproduced for producing shoots,
   (c) selecting and/or modifying the position of said shoots to obtain two shoots placed opposite each other on said plant, and
   (d) cultivating said plant until it can be planted.

7. The plant according to claim 6, which is an apple plant.

8. The plant according to claim 7, which is a pear plant.

9. The plant according to claim 6, wherein a so-called "chip"-like graft is grafted onto said rootstock propagating material and the position of said shoots is modified by pinching to obtain shoots placed opposed each other.

10. The plant according to claim 6, wherein a so-called triangle-like graft is grafted onto said rootstock propagating material and the position of said shoots is selected to obtain shoots placed opposed each other.

11. The plant according to claim 6, wherein a so-called "chip"-like graft of two buds is grafted onto said rootstock that is the same.

12. The plant according to claim 6, which is obtainable according to a method comprising:
   (a) transplanting of an already grafted rootstock with the variety to be reproduced and cultivation thereof until obtaining a developed pole,
   (b) cutting of a pole portion,
   (c) selecting and/or modifying the position of the shoots that have originated below said cut onto said pole to obtain two trunks, and
   (d) cultivating said plant until it can be planted.

13. A pome fruit tree plant of double trunk type comprising a rootstock having two shoots grafted onto it, said shoots being grafted so to grow vertically opposite each other.

14. The plant according to claim 13, which is an apple plant.

15. The plant according to claim 13, which is a pear plant.

* * * * *